(12) United States Patent
Nielsen et al.

(10) Patent No.: US 11,366,125 B2
(45) Date of Patent: Jun. 21, 2022

(54) SUBSTRATE CONVEYANCE SYSTEMS

(71) Applicant: HEWLETT-PACKARD DEVELOPMENT COMPANY, L.P., Spring, TX (US)

(72) Inventors: Jeffrey A. Nielsen, Corvallis, OR (US); Christie Dudenhoefer, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 244 days.

(21) Appl. No.: 16/603,119

(22) PCT Filed: Jul. 18, 2017

(86) PCT No.: PCT/US2017/042607
§ 371 (c)(1),
(2) Date: Oct. 4, 2019

(87) PCT Pub. No.: WO2019/017916
PCT Pub. Date: Jan. 24, 2019

(65) Prior Publication Data
US 2020/0110102 A1 Apr. 9, 2020

(51) Int. Cl.
*G01N 1/00* (2006.01)
*G01N 35/00* (2006.01)
*G01N 35/10* (2006.01)

(52) U.S. Cl.
CPC ... *G01N 35/00029* (2013.01); *G01N 35/0092* (2013.01); *G01N 35/1002* (2013.01); *G01N 35/1009* (2013.01); *G01N 35/1065* (2013.01); *G01N 2035/00039* (2013.01); *G01N 2035/00138* (2013.01); *G01N 2035/00277* (2013.01)

(58) Field of Classification Search
None
See application file for complete search history.

(56) References Cited

U.S. PATENT DOCUMENTS

| 5,580,524 | A | 12/1996 | Forrest et al. |
| 6,245,297 | B1* | 6/2001 | Kowallis ............... B01L 3/0244 422/562 |
| 6,402,292 | B1 | 6/2002 | Ninomiya |
| 7,832,853 | B2 | 11/2010 | Nakashima |
| 8,920,752 | B2* | 12/2014 | Tisone .................. C12M 41/00 422/509 |
| 2005/0093946 | A1 | 5/2005 | Tanner |
| 2009/0017491 | A1 | 1/2009 | Lemme et al. |

FOREIGN PATENT DOCUMENTS

| EP | 0891865 | 1/1999 |
| WO | WO-2002010773 A1 | 2/2002 |

OTHER PUBLICATIONS

Practical Computer Advice From Martin Kadansky; Jan. 2011; http://www.kadansky.com/files/newsletters/2011/2011_01_26.html.

* cited by examiner

*Primary Examiner* — Jyoti Nagpaul
(74) *Attorney, Agent, or Firm* — Fabian VanCott

(57) ABSTRACT

Examples described herein also provide a substrate conveyance system. The substrate conveyance system may include a conveyor surface to convey a number of substrates, and a number of apertures defined in the conveyor surface between the substrates as positioned on the conveyor surface. The location of the apertures is based on a location at which at least one reagent module dispenses a reagent.

20 Claims, 5 Drawing Sheets

SUBSTRATE CONVEYANCE SYSTEMS

BACKGROUND

The life sciences research and associated diagnostic industries use a number of reagents and patient samples to perform testing and diagnostics. Dispensing liquids such as these reagents and patient samples in quantities from picoliters to microliters may be used in many areas of pharmaceutical and biology research. For example, dispensing a number of reagents in these quantities may be useful in medical and veterinary diagnostics, forensics testing, and agricultural testing to determine the presence of a chemical or biological in a sample. Even within these fields, low-volume liquid dispensing may be used for many different operations.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
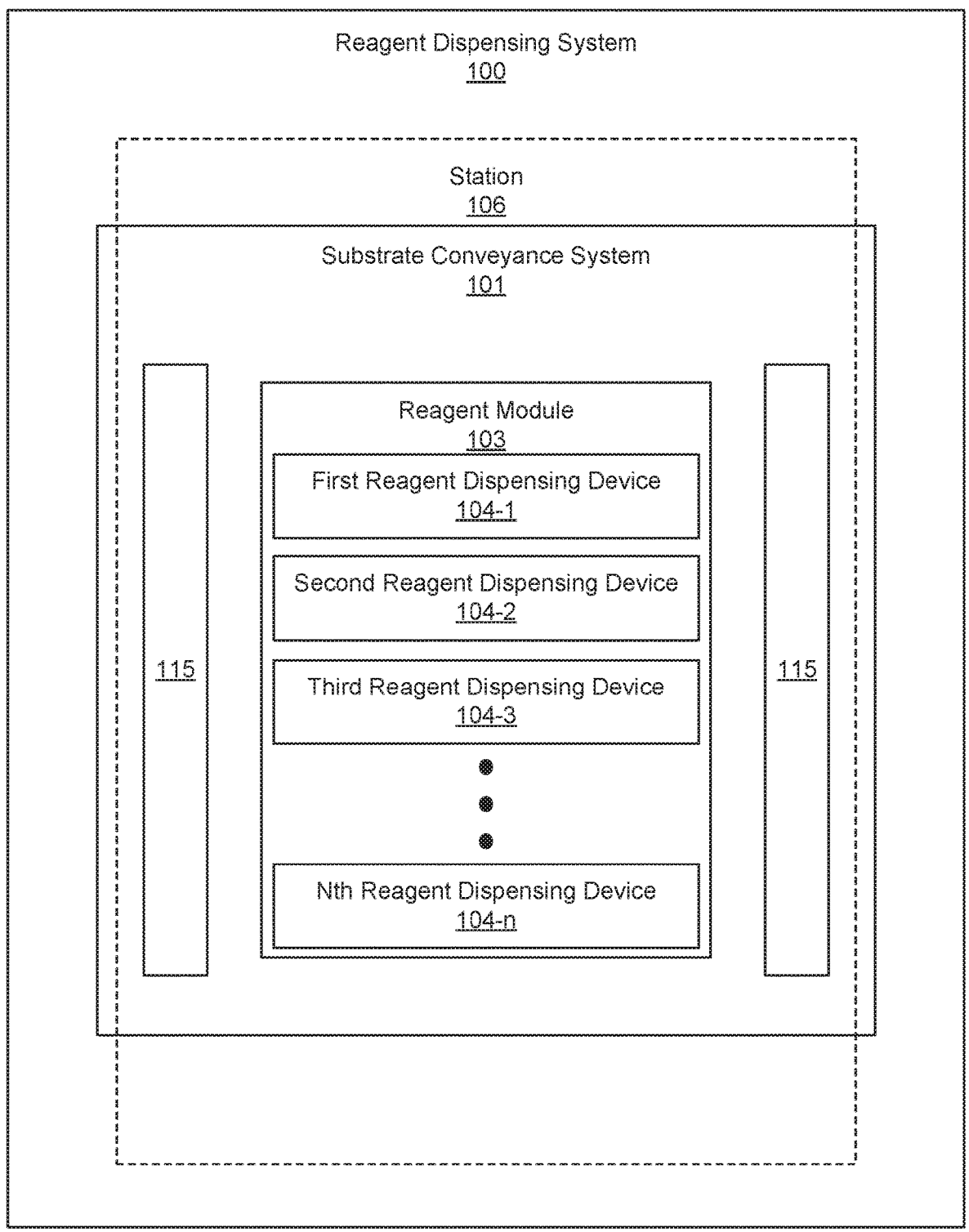
FIG. 1 is a block diagram of a reagent dispensing system, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Human interaction during life science research and diagnostic processes may lead to mistakes in those processes. Such mistakes may decrease the likelihood of scientific breakthroughs and increase the likelihood of misdiagnosis of patient's illnesses. Further, with human interaction, these processes may prove tedious thereby increasing the costs associated with these processes as well as increase the time spent completing the processes. Automation of these processes, however, limits mistakes, time, and costs.

Instruments and tools used in life science research and diagnostic processes have been developed to increase efficiency, decrease costs, and decrease time spent conducting this research or completing diagnosis. However, even with these developments, increased numbers of reagents used to interact with a sample increase the complexity and time of completing those tasks.

In an automated, computer-driven diagnostics system, reagents may be dispensed based on a number of test protocols, and a wide variety and volumes of different reagents may be dispensed based on these test protocols. However, some reagent dispensing devices may become clogged or obstructed due to dispensing a reagent that tends to encourage such obstructing. This clogging issue may be exacerbated if the reagent dispersion system dispenses a wide range of reagents with different properties that may each obstruct the reagent dispensing devices in a different way or in different degrees.

The reagents may be dispensed onto a substrate such as, for example, microscope slides containing biological samples for research or medical diagnoses using the reagent dispensing devices, and the accuracy and reliability of the dispensing may be verified. In order to properly dispense the reagents, a number of servicing processes may be performed on a number of reagent dispensing devices. However, in some instances, the reagent dispensing devices may be moved off-line from an in-line dispensing area in order to service the reagent dispensing devices. One such servicing process that takes the reagent dispensing devices off-line may include a spitting operation. In some instances, a portion of the substrate onto which the reagent is to be dispensed may be used as a location to perform a spitting operation. This portion may be referred to as a mask region, and may be used to spit a volume of reagent onto a non-used portion of the substrate. However, this may create disorganization and mess on the substrate, and may also cause the reagents dispensed before or after the spitting operation to become contaminated. Further, in some instances, a spitting operation may be performed by ejecting reagent directly onto a conveyance system that carries the substrates. However, this option also creates a mess on the conveyance system and may result in the cross contamination of reagents on the substrates and may, in the case of dispensing of biological materials, create a biohazard.

Examples described herein provide a reagent dispensing system. The reagent system may include a substrate conveyance system to convey a number of substrates, at least one station located in-line with respect to the substrate conveyance system, where the station includes at least one reagent module to dispense a reagent on the substrates, and a number of apertures defined in the substrate conveyance system. The reagent module performs a spit operation in response to at least one of the number of apertures passing below the reagent module.

The reagent dispensing system may include a spittoon located below the substrate conveyance system to receive reagents spat through the apertures. In another example, the apertures in the substrate conveyance system may include an absorbent pad. The at least one reagent module does not move relative to the substrate conveyance system during the spit operation. The reagent dispensing system may include a capping module to seal a number of nozzles of a number of reagent dispensing devices within the reagent module from ambient atmosphere.

In one example, the apertures may be defined in the substrate conveyance system between each of the substrates. Data regarding the position of the apertures along the substrate conveyance system and below the at least one reagent module is sent to the at least one reagent module. The data signals to the at least one reagent module to perform the spit operation.

Examples described herein also provide a substrate conveyance system. The substrate conveyance system may include a conveyor surface to convey a number of substrates, and a number of apertures defined in the conveyor surface between the substrates as positioned on the conveyor surface. The location of the apertures is based on a location at which at least one reagent module dispenses a reagent. Data regarding the position of the apertures along the conveyor surface and below the at least one reagent module is sent to the at least one reagent module.

The substrate conveyance system may include a spittoon located below the conveyor surface to receive reagents spat through the apertures. Further, the substrate conveyance system may include an absorbent pad located within the apertures in the conveyor surface. The apertures are defined in the conveyor surface at a periodic interval. The data regarding the position of the apertures along the conveyor surface and below the at least one reagent module defines a time at which the at least one reagent module it to perform a spit operation Examples described herein also provide a computer program product for in-line spit servicing. The computer program product may include a computer readable storage medium including computer usable program code embodied therewith. The computer usable program code, when executed by a processing device determines whether a number of reagent dispensing devices are scheduled for a spit operation, in response to a determination that a number of the reagent dispensing devices are scheduled for a spit operation, identifies a time an aperture defined within a substrate conveyance system is present under the reagent dispensing devices, performs the spit operation based on the time the aperture is present under the reagent dispensing devices.

The computer usable program code, when executed by the processing device, instructs the reagent dispensing devices to move to a capping module to seal the reagent dispensing devices from ambient atmosphere. Further, the computer usable program code, when executed by the processing device, sends data regarding the time the aperture is present under the reagent dispensing devices.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

Turning now to the figures, FIG. 1 is a block diagram of a reagent dispensing system (100), according to an example of the principles described herein. The reagent dispensing system (100) may be any system that dispenses a reagent onto a substrate. In one example, the reagent dispensing system (100) is an automated, computer driven system that dispenses, through a number of reagent dispensing devices, a number of different reagents. The reagents may be any chemical or biological substance that may be used in any chemical reaction such as titrations, combinations, decompositions, single displacements, precipitations, neutralizations, double displacements, combustions, and reductions/oxidations, among other types of chemical or biological reactions. The reagents may be, for example, solutions including nucleic acid; deoxyribonucleic acid (DNA); ribonucleic acid (RNA); small (or short) interfering RNA (siRNA); polymerase chain reaction (PCR) master mix; proteins including, for example, enzymes and antibodies; other biomolecules including, for example, peptides, oligos, and lipids; small molecules, nanoparticles, biocides, cells or other tissue components, histology stains, linker reagents, inhibitors, aqueous solutions, or many other reagents.

The reagent dispensing system (100) may include a substrate conveyance system (101) to convey a number of substrates. The substrate conveyance system (101) may be, for example, a conveyor belt that moves a number of substrates under an area where the reagent module (103) may deposit a number of reagents onto the substrate. The substrate conveyance system may travel in either a positive x-direction or a negative x-direction in order to allow the substrates to move left to right or right to left under the reagent module (103). This allows the substrates to have a plurality of reagents deposited on them, and may also allow for chemical reactions to occur on the substrate before a subsequent reagent is deposited on the substrate. However, any other type of conveyance system may be used such as, for example, mechanical stages that moves in and out of the reagent deposition area (402), rolls or reels of flexible material that moves underneath the reagent dispensing devices (104) within the reagent modules (103), or other conveyance systems.

The reagent dispensing system (100) may also include at least one station (106) located in-line with respect to the substrate conveyance system (101). The station (106) may include at least one reagent module (103) to dispense a reagent on the substrates.

A number of apertures (115) may be defined in the substrate conveyance system (101). The apertures (115), as described herein, serve as a portion through which a number of reagent dispensing devices (104-1, 104-2, 104-3, 104-n, collectively referred to herein as 104) may perform a spitting operation. A "spitting" operation is an action taken by the processor of the reagent dispensing system (100) instructing at least one of the reagent dispensing devices (104) to purge its reagent ejection elements such as its nozzles by sending it a sequence of fire pulses, possibly of greater energy than the normal firing pulse. This serves to ensure that the reagent contained in the nozzles does not dry, causing a blockage of dry reagent, which stops the nozzle from firing correctly. Spitting routines also help to clear already blocked, or partially blocked nozzles, which may be caused by fibers or dried reagent, for example. In one example, the reagent module (103) performs a spit operation in response to at least one of the number of apertures (115) passing below the reagent module (103). In one example, the reagent module (103) does not move relative to the substrate conveyance system (101) during the spit operation. In this manner, the reagent module (103) does not have to be taken off-line, but may perform the spit operation online and even while depositing reagent onto the substrates.

The reagent module (103) may include a module frame to mechanically and electrically couple the reagent dispensing devices (104) within the reagent module (103) to the reagent dispensing system (100). The module frame may include a number of mechanical interfaces to align the reagent dispensing devices (104) with respect to the reagent module (103). Further, the module frame may include a number of electrical interfaces to electrically couple the reagent dispensing devices (104) to the reagent module (103), and, in turn, the reagent dispensing system (100). Signals may be sent by the reagent dispensing system (100) to the reagent dispensing devices (104) via the number of electrical interfaces of the reagent module (103). These signals may be used to instruct the reagent dispensing devices (104) to dispense a volume of reagent onto a substrate located on the substrate conveyance system (101).

Each of the reagent dispensing devices (104) may be any device that dispenses a number of reagents. In one example, the reagent dispensing devices (104) may include devices that dispense different volumes of reagents. For example, a first reagent dispensing device (104-1) may dispense a first range of volumes of a reagent, a second reagent dispensing device (104-2) may dispense a second range of volumes of a reagent where the second range of volumes may be more voluminous relative to the first range of volumes, and a third reagent dispensing device (104-3) may dispense a third range of volumes of a third reagent where the third range of volumes may be more voluminous relative to the second range of volumes.

As depicted using the ellipses in FIG. 1 and the inclusion of an Nth reagent dispensing device (104-n), any number of reagent dispensing devices may be included within a reagent module (103). Each of these reagent dispensing devices (104) may have differing architectures or form factors that allow them to dispense their respective volumes. For example, the first reagent dispensing device (104-1) may include a cassette device that dispenses between approximately 1 picoliter (pL) and 10 microliters (µL) as the first range of volumes of a reagent. The cassette may include, for example, a T8+ or D4+ dispensehead cassette produced and distributed by HP Inc. With these types of cassettes, a relatively small amount of reagent may be dispensed at a given time. In one example, the first reagent dispensing device (104-1) or cassette may be any digitally addressable fluid ejection device that contains a very small amount of reagent on the order of approximately up to 1 milliliter (mL). Further, the fluid within the first reagent dispensing device (104-1) may come pre-filled in the first reagent dispensing device (104-1), or a technician may fill the first reagent dispensing device (104-1) with a pipette or similar preliminary, manual reagent dispensing device at the time of use of the first reagent dispensing device (104-1). The first reagent dispensing device (104-1) or cassette may be used to dispense volumes of fluid that are less frequently dispensed relative to other reagents, are negatively susceptible to environmental conditions, are expensive to inventory, are mixed immediately before use, have a relatively short shelf life, have other properties that lend their use to relatively smaller volumes, or combinations thereof.

Further, in one example, the second reagent dispensing device (104-2) may include a digitally addressable fluid ejection device. In this example, the digitally addressable fluid ejection device may include a number of fluid ejection die to dispense the second range of volumes of a reagent. For example, the second reagent dispensing device (104-2) may include a digitally addressable fluid ejection device that dispenses between approximately 100 nanoliters (nL) and 100 µL as the second range of volumes of a reagent. In one example, the digitally addressable fluid ejection device may be a thermal or piezoelectric fluid ejection device where the reagents are dispensed from an array of fluid ejection chambers and nozzles of the fluid ejection die using thermal expansion or piezoelectric forces applied to the reagents. In this example, the second reagent dispensing device (104-2) may contain, for example, 1 to 40 milliliters of reagent and may be pre-packaged with the reagent before the time of use.

Still further, in one example, the third reagent dispensing device (104-3) may include any high-volume reagent dispensing device such as, for example, a digitally addressable fluid ejection device fluidically coupled to an off-line bulk supply (407) of reagent. In this example, the third reagent dispensing device (104-3) may be used in connection with the dispensing of bulk amounts of reagents onto the substrate. The third reagent dispensing device (104-3) may include a digitally addressable fluid ejection device that dispenses between approximately 100 nanoliters (nL) and 100 µL as the third range of volumes of a reagent. In this example, the third reagent dispensing device (104-3) may contain bulk volumes of reagent since this bulk reagent dispensing device may be used most often, Thus, third reagent dispensing device (104-3) may contain for example, 40 to 1,000 mL of reagent and may be pre-packaged with the reagent before the time of use.

In one example, a spittoon may be located below the substrate conveyance system (101) to receive reagents spat through the apertures (115). The spittoon may be any vessel located below the conveyance system (101) and the reagent dispensing devices (104) of the reagent module (103) to catch reagents spat through the apertures (115) during a spitting operation of at least one of the reagent dispensing devices (104).

In another example, the apertures (115) in the substrate conveyance system (101) may include an absorbent pad located level with the substrate conveyance system (101), or, in another example, below the substrate conveyance system (101) on an opposite side of the conveyance system (101) relative to the reagent module (103). In still another, example, the apertures (115) in the substrate conveyance system (101) may include a spittoon and an absorbent pad. The absorbent pad may be made of a felt, fibrous, sponge-like, or other porous material which may assist in storing the reagent residue until the volatile or evaporatable components evaporate therefrom leaving solid waste components behind. In this example, the absorbent pad may be dimensioned to fit within the apertures (115). Further, the absorbent pad may include a weight or thickness sufficient to achieve a target reagent absorption.

The apertures (115) may be defined in the substrate conveyance system (101) between a number of the substrates. For example, the substrates may be placed on the substrate conveyance system (101) such that the substrates do not obscure the apertures (115). In another example, the apertures (115) may be defined in the substrate conveyance system (101) periodically and spaced between one another such that the substrates may be placed between each of the apertures (115), or, in other words, that an aperture (115) is presented between each substrate on the substrate conveyance system (101). In another example, data regarding the positions of the substrates on the substrate conveyance system (101) and the apertures (115) may be provided to the reagent dispensing system (100) so that the reagent dispensing system (100) may know the location of the substrates on the substrate conveyance system (101) and the apertures (115) at any given time. In this example, the apertures (115) may be defined in the substrate conveyance system (101) at non-periodic, asymmetric, scattered, or irregular locations within the substrate conveyance system (101) as well.

Figure 2:
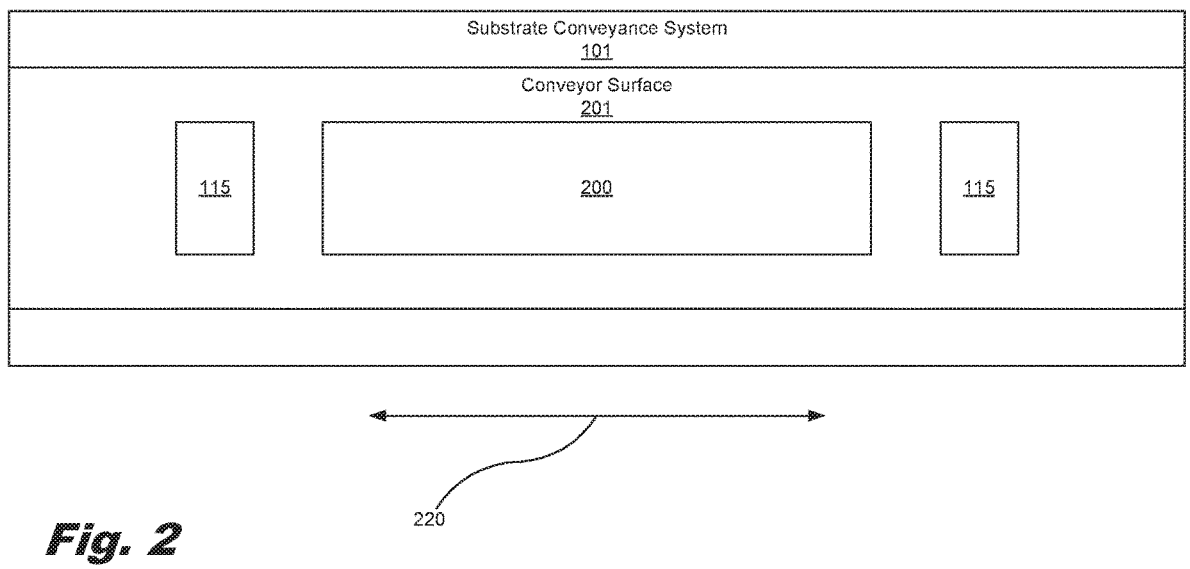
FIG. 2 is a block diagram of a substrate conveyance system, according to an example of the principles described herein.

FIG. 2 is a block diagram of a substrate conveyance system (101), according to an example of the principles described herein. The substrate conveyance system (101) may include a conveyor surface (201) to convey a number of substrates (200). In one example, the substrates may be microscope slides, test samples, cell-culture dishes such as Petri dishes, paper, tissue samples, porous media, lateral flow strip media, coated media, microtiter plates, or other substrates. The substrate conveyance system (101) may be, for example, a conveyor belt that moves a number of substrates (200) under an area where the reagent module (103) may deposit a number of reagents onto the substrate (200). The substrate conveyance system may travel in either a positive x-direction or a negative x-direction as indicated by arrow (220) in order to allow the substrates to move left to right or right to left under the reagent module (103). This allows the substrates to have a plurality of reagents deposited on them, and may also allow for chemical reactions to occur on the substrate before a subsequent reagent is deposited on the substrate.

The substrate conveyance system (101) may include a number of apertures (115) defined in the conveyor surface (201) of the substrate conveyance system (101) between the substrates (200) as positioned on the substrate conveyance system (101). The location of the apertures (115) is based on a location at which at least one reagent module (103) dispenses a reagent. In this manner, the reagent dispensing devices (104) of the reagent module (103) may both dispense reagent onto the substrates (200) as well as participate in a spitting operation by spitting the reagent in the apertures (115). In one example, data regarding the position of the apertures (115) along the conveyor surface (201) and below at least one reagent module (103) is sent to the reagent module (103). More regarding the manner in which the reagent dispensing devices (104) of the reagent modules (103) spit reagent into the apertures (115) is described herein.

Figure 3:
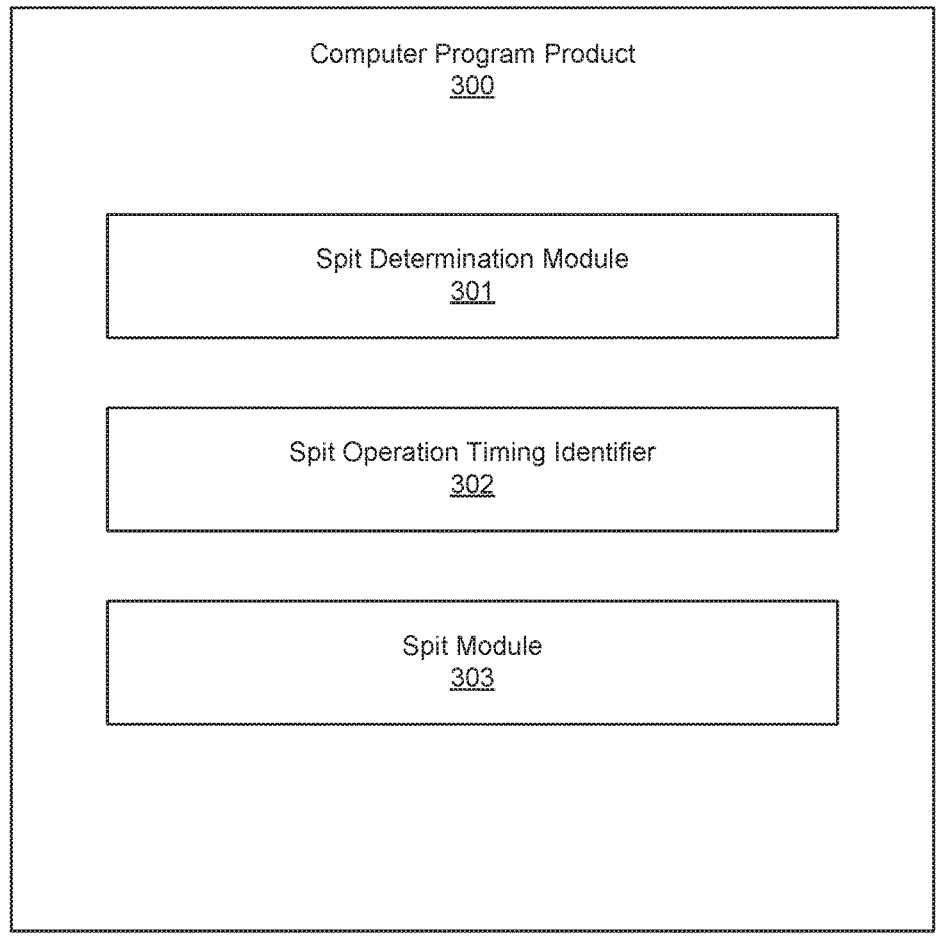
FIG. 3 is a block diagram of a computer program product for in-line spit servicing, according to an example of the principles described herein.

FIG. 3 is a block diagram of a computer program product (300) for in-line spit servicing, according to an example of the principles described herein. The computer program product may include a computer readable storage medium including computer usable program code embodied therewith. The computer usable program code, and a spit determination module (301), when executed by a processing device of the reagent dispensing system (100) determines whether a number of reagent dispensing devices (104) are to undergo a spit operation. In one example, the spit determination module (301) may determine that a spit operation should be executed based on a schedule or a lapse of a predetermined amount of time, based on an identified clogging of the reagent dispensing devices (104), before a number of reagents are dispensed from the reagent dispensing devices (104), after a number of reagents are dispensed from the reagent dispensing devices (104), at a time in which the apertures (115) are present under the reagent dispensing devices (104), or combinations thereof.

In one example, the spitting operation may occur any time an aperture (115) moves to a position under the reagent dispensing devices (104). In this example, the spit determination module (301) may determine that a spitting operation may be executed when an aperture (115) is positioned under the reagent dispensing devices based on a regular pattern of the apertures' positions as defined in the conveyor surface (201) and the speed at which the conveyor surface (201) moves past the reagent dispensing devices (104). Thus, a spit operation timing identifier (302) may be used to identify the timing of the apertures' presence by either knowing or receiving information from a sensor as to the physical space between the apertures (115) as well as the speed at which the conveyor surface (201) is moving. With this information, the reagent dispensing system (100) may accurately know the position and movement of the apertures (115), and may store this information for a future spit operation. The spit operation timing identifier (302) may identify this timing in response to a determination that a number of the reagent dispensing devices (104) are to undergo a spit operation as identified by the spit determination module (301).

A spit module (303) of the computer program product (300) may perform the spit operation based on the timing identified by the spit operation timing module (302). In one example, the timing information identified by the spit operation timing module (302) may be sent to a processing device, and the processing device may instruct the reagent dispensing devices (104) to perform a spit operation based on the information identified by the spit operation timing module (302).

Figure 4:
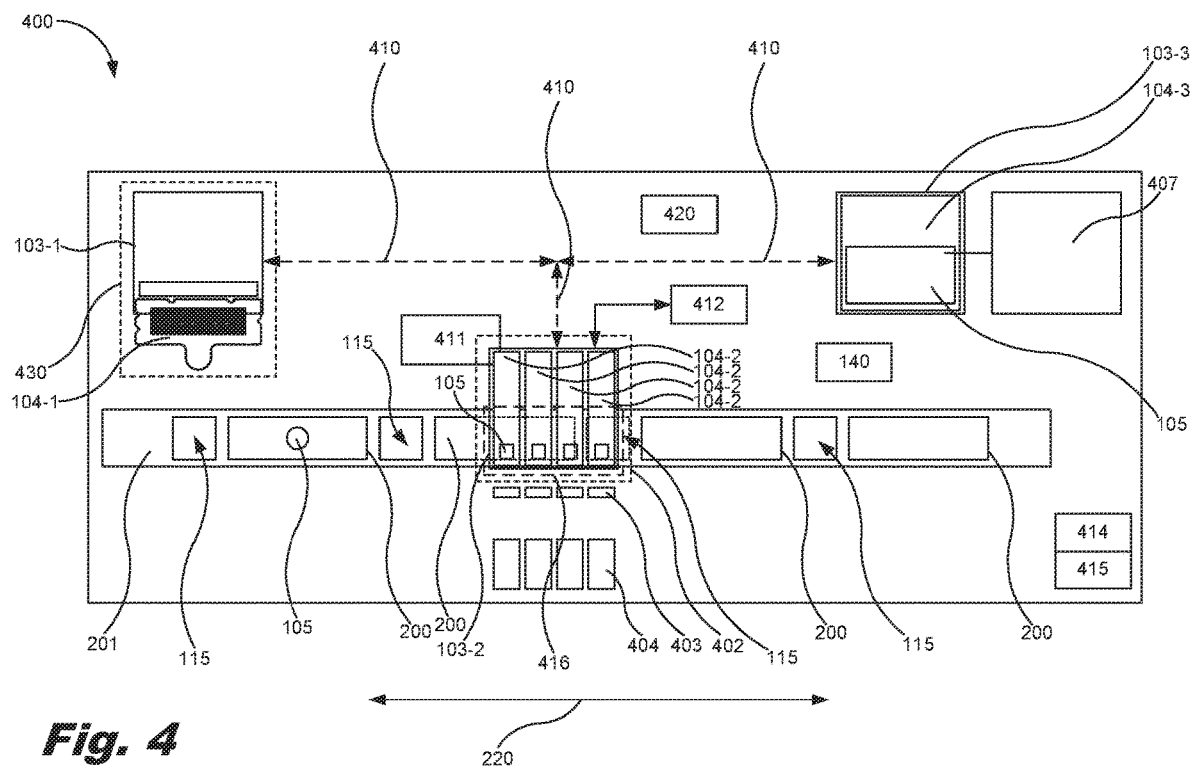
FIG. 4 is a block diagram of a reagent dispensing system, according to another example of the principles described herein.

FIG. 4 is a block diagram of a reagent dispensing system (400), according to another example of the principles described herein. The reagent dispensing system (400) may include a number of elements including the reagent dispensing system (100) and its various elements described in connection with FIGS. 1 through 3. Therefore, similarly-numbered elements included in FIGS. 1 through 3 and described in connection with FIGS. 1 through 3 designate similar elements within the reagent dispensing system (400) of FIG. 4. As depicted in FIG. 4, a reagent module (103-2) is located within a reagent deposition area (402) of the reagent dispensing system (400) and is considered to be in an in-line position to dispense reagent (105) onto a number of substrates (200). In this manner, the reagent modules (103-1, 103-2, 103-3) may be physically coupled to the reagent dispensing system (400) and be seated within the reagent deposition area (402) in order to dispense reagent (105) onto the substrates (200).

Further, in this physically coupled state, a number of electrical interfaces (503) located on the reagent modules (103) electrically interface with the electrical interfaces (412) located in the reagent deposition area (402) of the reagent dispensing system (400). This allows the reagent dispensing system (400) to send instructions in the form of signals to the modules (103-1, 103-2, 103-3) that cause the various reagent dispensing devices (104-1, 104-2, 104-3) to dispense their respective reagents (105) onto the substrates (200).

As depicted in FIG. 4, a number of exchange paths (410) depicted as dashed lines indicate a path on which an off-line reagent module (103) may take when being switched with an in-line module (103-2). In this example, an automated storage and retrieval system (ASRS) (420) may be used to transport the reagent modules (103-1, 103-2, 103-3) to and from the reagent deposition area (402). The ASRS (420) may include any number of conveyor systems, lift systems, robotic arms, other ASRS systems, and combinations thereof. In another example, a technician may manually exchange the reagent modules (103), In another example, the in-line reagent module (103-2) may be exchanged for an off-line reagent module (103-1, 103-3) by a user such as a technician manually exchanging the reagent modules (103-1, 103-2, 103-3).

The reagent dispensing system (400) may further include at least one environmentally-controlled area (430) to preserve a number of reagents (105) within the reagent modules (103-1, 103-2, 103-3). Many reagents dispensable by the reagent modules (103-1, 103-2, 103-3) may have a shelf life or may perform better in a reaction if they are stored in an area where its environment may be controlled. The environmentally-controlled areas (430) may be environmentally sealed from the remainder of the reagent dispensing system (400), and may control, for example, a humidity level, a temperature, a pressure, or other environmental states within the reagent dispensing system (400).

A processing device (414) and a data storage device (415) may be included in the reagent dispensing system (400) to instruct and store data about the reagent modules (103-1, 103-2, 103-3) and their respective reagent dispensing devices (104-1, 104-2, 104-3). In one example, the computer program products described herein may be stored in the data storage device (415), and provided to the processing device (414) for execution by the processing device (414). The processing device (414) may provide signals to the reagent dispensing devices (104-1, 104-2, 104-3) to instruct the reagent dispensing devices (104-1, 104-2, 104-3) to dispense their respective reagents (105) onto the substrates (200). Further, the processing device (414) may instruct the ASRS (420) to exchange the in-line reagent module (103-2) with an off-line reagent module (103-1, 103-3) in order to dispense a different reagent or volume of reagent. The processing device (414) may further provide instructions to the conveyor surface (101) as to speed and direction in moving the substrates (200) within the reagent deposition area (402) and under the reagent modules (103-1, 103-2, 103-3).

The processing device (414) may further actuate to the conveyor surface (101) in order to cause an aperture (115) to move under the reagent module (103-1, 103-2, 103-3), and may instruct the reagent dispensing devices (104) within the reagent module (103-1, 103-2, 103-3) to perform a spitting operation. In doing so, the processing device (414) may receive data from a sensor (140) that indicates the direction of travel of the conveyor surface (101), the speed of the conveyor surface (101), the locations of the apertures (115), the spacing between the apertures (115), the timing at which the apertures (115) are positioned under the reagent dispensing devices (104) within the reagent module (103), or combinations thereof. In this manner, the processing device (414) may know where the apertures (115) are located at any given time and instruct the reagent dispensing devices (104) within the reagent module (103) to perform a spitting operation at a time when the apertures (115) are underneath the reagent dispensing devices (104).

The data storage device (415) may include various types of memory modules, including volatile and nonvolatile memory. For example, the data storage device (415) of the present example may include Random Access Memory (RAM), Read Only Memory (ROM), and Hard Disk Drive (HDD) memory. Many other types of memory may also be utilized, and the present specification contemplates the use of many varying type(s) of memory in the data storage device (415) as may suit a particular application of the principles described herein. In certain examples, different types of memory in the data storage device (415) may be used for different data storage needs. For example, in certain examples the processing device (414) may boot from Read Only Memory (ROM), maintain nonvolatile storage in the Hard Disk Drive (HDD) memory, and execute program code stored in Random Access Memory (RAM). The data storage device (415) may comprise a computer readable medium, a computer readable storage medium, or a non-transitory computer readable medium, among others. For example, the data storage device (415) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device. The data storage device (415) may store computer usable program code described herein for execution by the processing device.

As depicted in FIG. 4, the conveyor surface (101) may move in a positive x-direction or a negative x-direction to move the substrates (200) underneath the reagent modules (103-1, 103-2, 103-3) as indicated by arrow (220) in order to dispense reagent (105) onto the substrates (200). Further, the reagent modules (103-1, 103-2, 103-3) may move perpendicular to the direction of the movement of the conveyor surface (101) in order to service and protect the reagent dispensing devices (104-1, 104-2, 104-3) within the reagent module (103-1, 103-2, 103-3) in ways other than performing the spitting operation. For example, the reagent dispensing system (400) may include a wiping station (403) to wipe off or clean the reagent dispensing devices (104-1, 104-2, 104-3) of the reagent module (103-1, 103-2, 103-3). In one example, the wiping station (403) wipes a nozzle plate or other ejection surface of the at least one reagent dispensing device (104-1, 104-2, 104-3) within the reagent module (103-1, 103-2, 103-3). The reagent dispensing system (400) may also include a capping station (404) to seal a number of nozzles or other ejection devices of the at least one reagent dispensing device (104-1, 104-2, 104-3) from ambient atmosphere around the reagent deposition area (402).

In one example, the computer usable program code of the computer program product (300) may send data regarding the time the apertures (115) are present under the reagent dispensing devices (104-1, 104-2, 104-3) from the sensor (140) to the processing device (414) where the processing device (414) may use the data to determine a correct time to instruct the reagent dispensing devices (104-1, 104-2, 104-3) to perform a spitting operation into the apertures (115). In this manner, the data may signal to the reagent dispensing devices (104-1, 104-2, 104-3) within the reagent module (103-1, 103-2, 103-3) to perform the spit operation.

As depicted in FIG. 4, a reagent capture device (416) may be included within the reagent dispensing system (400) located underneath the reagent dispensing devices (104-1, 104-2, 104-3) of the reagent module (103-1, 103-2, 103-3) and the conveyor surface (201). In one example, the reagent capture device (416) may be a spittoon or other vessel that may receive reagents (105) spat through the apertures (115). In another example, the reagent capture device (416) may be an absorbent pad located within the apertures (115). In another example, the reagent capture device (416) may be a combination of a spittoon and an absorbent pad. In one example, the reagent module (103-1, 103-2, 103-3) does not move relative to the substrate conveyance system (101) during a spit operation. This is due to the alignment of the reagent capture device (416) and the apertures (115) with an in-line position of the reagent module (103-1, 103-2, 103-3). In this manner, the reagent module (103-1, 103-2, 103-3) does not have to be taken off-line to perform the spit operation, but may perform the spit operation online and even while depositing reagent onto the substrates.

Figure 5:
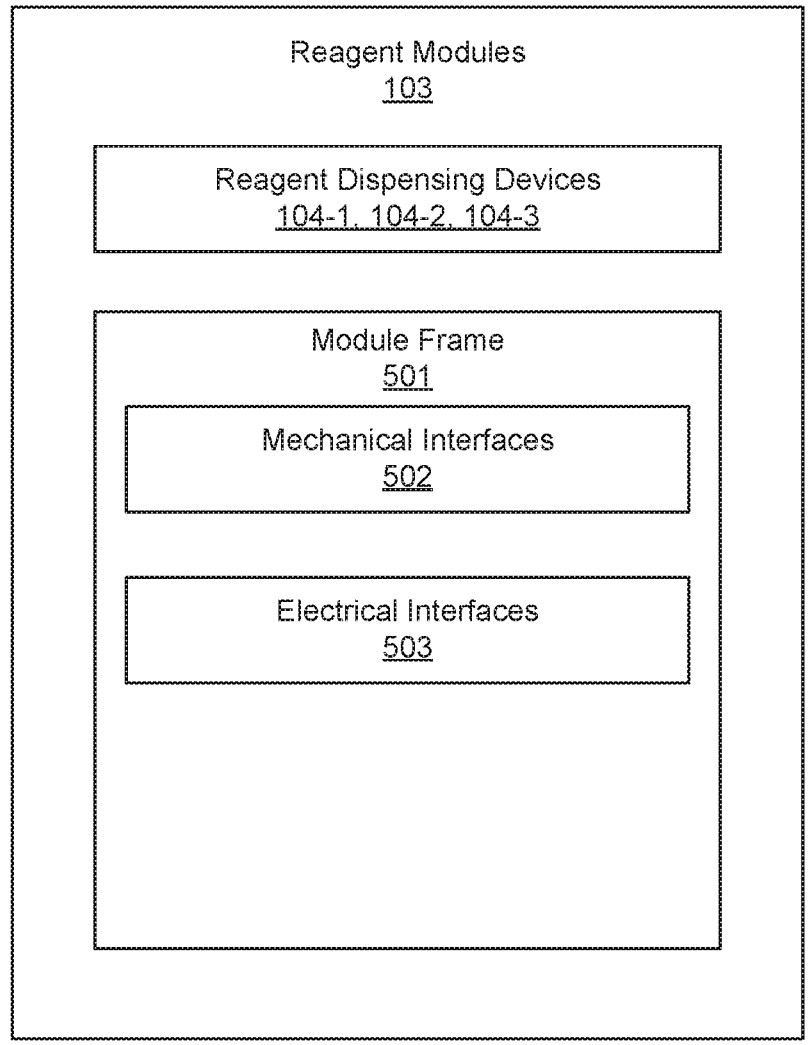
FIG. 5 is a block diagram of a reagent module, according to an example of the principles described herein.

With continued reference to FIG. 4, FIG. 5 is a block diagram of a reagent module (103-1, 103-2, 103-3), according to an example of the principles described herein. When a reagent module (103-1, 103-2, 103-3) is placed in the reagent deposition area (402), a number of mechanical (411) and electrical (412) interfaces within the reagent dispensing system (400) and located at the reagent deposition area (402) interface with mating mechanical (502) and electrical (503) interfaces of the module frame (501) on the reagent modules (103-1, 103-2, 103-3). In this manner, the reagent modules (103-1, 103-2, 103-3) may be physically coupled to the reagent dispensing system (400) and be seated within the reagent deposition area (402) in order to dispense reagent (105) onto the substrates (200).

In one example, the module frame (501) is included within the reagent module (103-1, 103-2, 103-3). The module frame (501) mechanically and electrically couples the reagent dispensing devices (104-1, 104-2, 104-3) within the reagent module (103-1, 103-2, 103-3) to the reagent dispensing system (400). The module frame (501) may include the mechanical interfaces (502) to align the reagent dispensing devices (104-1, 104-2, 104-3) with respect to the reagent module (103-1, 103-2, 103-3). Further, the module frame (501) may include the electrical interfaces (503) to electrically couple the reagent dispensing devices (104-1, 104-2, 104-3) to the reagent module (103-1, 103-2, 103-3), and, in turn, the reagent dispensing system (400). Signals may be sent by the reagent dispensing system (400) to the reagent dispensing devices (104-1, 104-2, 104-3) via the number of electrical interfaces (503) of the reagent module (103-1, 103-2, 103-3). These signals may be used to instruct the reagent dispensing devices (104-1, 104-2, 104-3) to disperse a volume of reagent (105) onto a substrate (200) located on the substrate conveyance system (101). In this manner, the reagent modules (103-1, 103-2, 103-3) may be physically coupled to the reagent dispensing system (400) and be seated within the reagent deposition area (402) in order to dispense reagent (105) onto the substrates (200).

Further, in this physically coupled state, a number of electrical interfaces (503) located on the reagent modules (103) electrically interface with the electrical interfaces (412) located in the reagent deposition area (402) of the reagent dispensing system (400). This allows the reagent dispensing system (400) to send instructions in the form of signals to the modules (103-1, 103-2, 103-3) that cause the various reagent dispensing devices (104-1, 104-2, 104-3) to dispense their respective reagents (105) onto the substrates (200).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processing device of a general-purpose computer, special purpose computer, or other programmable data processing apparatus to produce a machine, such that the computer usable program code, when executed via, for example, the processing device (414) of the reagent dispensing system (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a substrate conveyance system. The substrate conveyance system may include a conveyor surface to convey a number of substrates, and a number of apertures defined in the conveyor surface between the substrates as positioned on the conveyor surface. The location of the apertures is based on a location at which at least one reagent module dispenses a reagent.

This substrate conveyance system may increase the speed at which the reagent dispensing devices are able to dispense the reagent since they and their associated reagent modules do not move off-line to, for example, a service location before dispensing an amount of reagent on a substrate. Further, this substrate conveyance system enables spitting immediately before the dispensing of the reagent on the substrate takes place, ensuring that the reagent dispensing devices are in good health. Still further, the substrate conveyance system enables spitting immediately before the dispensing operation without using a mask-region on the slide for such purposes.

The preceding description has been presented to illustrate and describe examples of the principles described. This description is not intended to be exhaustive or to limit these principles to any precise form disclosed. Many modifications and variations are possible in light of the above teaching.

What is claimed is:

1. A reagent dispensing system, comprising:
   a substrate conveyance system to convey a number of substrates;
   at least one station located in-line with respect to the substrate conveyance system, the station comprising at least one reagent module to dispense a reagent on the substrates; and
   a number of apertures defined in the substrate conveyance system,
   wherein the reagent module performs a spit operation in response to at least one of the number of apertures passing below the reagent module, the reagent module spitting at an aperture passing below the reagent module.

2. The reagent dispensing system of claim 1, comprising a spittoon located below the substrate conveyance system to receive reagents spat through the apertures.

3. The reagent dispensing system of claim 1, wherein the apertures in the substrate conveyance system comprises an absorbent pad.

4. The reagent dispensing system of claim 1, wherein the at least one reagent module does not move relative to the substrate conveyance system during the spit operation.

5. The reagent dispensing system of claim 1, comprising a capping module to seal a number of nozzles of a number of reagent dispensing devices within the reagent module from ambient atmosphere.

6. The reagent dispensing system of claim 1, wherein the apertures are defined in the substrate conveyance system between each of the substrates.

7. The reagent dispensing system of claim 1, wherein data regarding the position of the apertures along the substrate conveyance system and below the at least one reagent module is sent to the at least one reagent module, the data signaling to the at least one reagent module to perform the spit operation.

8. The reagent dispensing system of claim 1, wherein the apertures are disposed at a periodic interval along the substrate conveyance system, the reagent module using the periodic interval to time the spitting.

9. The reagent dispensing system of claim 1, wherein the at least one reagent module comprises a plurality of reagent modules, each reagent module having a different architecture to dispense different volumes of reagent.

10. The reagent dispensing system of claim 1, wherein the apertures are disposed at irregular locations along the substrate conveyance system, the reagent module having data indicating where the apertures are located for timing of the spitting by the reagent module at the apertures passing below the reagent module.

11. A method of operating a reagent dispensing and substrate conveyance system, comprising:
conveying a number of substrates to a reagent module on a conveyor surface;
dispensing reagent from the reagent module to the substrates on the conveyor surface;
the conveyor surface comprising a number of apertures defined in the conveyor surface between adjacent substrates as positioned on the conveyor surface,
the method further comprising spitting reagent from the reagent module into the apertures to prevent clogging of the reagent module.

12. The method of claim 11, wherein data regarding the position of the apertures along the conveyor surface and below the at least one reagent module is sent to the at least one reagent module to time the spitting in response to an aperture being positioned below the reagent module.

13. The method of claim 12, wherein the apertures are spaced periodically along the conveyor surface and the data defines a time at which the periodically spaced apertures are positioned at the reagent module for a spit operation.

14. The method of claim 11, comprising spitting reagent through the apertures and into a spittoon located below the conveyor surface.

15. The method of claim 11, comprising collecting reagent spit from the reagent module to an aperture with an absorbent pad located within the aperture in the conveyor surface.

16. The method of claim 11, further comprising spitting reagent through the apertures.

17. The method of claim 11, further comprising wiping the reagent module to clean reagent dispensing devices of the reagent module.

18. A computer program product for in-line spit servicing, the computer program product comprising:
a computer readable storage medium comprising computer usable program code embodied therewith, the computer usable program code to, when executed by a processing device:
determine whether a number of reagent dispensing devices are scheduled for a spit operation;
in response to a determination that a number of the reagent dispensing devices are scheduled for a spit operation, identifying a time an aperture defined within a substrate conveyance system is present under the reagent dispensing devices; and
performing the spit operation into the aperture based on the time the aperture is present under the reagent dispensing devices.

19. The computer program product of claim 18, wherein the computer usable program code, when executed by the processing device, instructs the reagent dispensing devices to move to a capping module to seal the reagent dispensing devices from ambient atmosphere.

20. The computer program product of claim 18, wherein the computer usable program code, when executed by the processing device, sends data regarding the time the aperture is present under the reagent dispensing devices.

* * * * *